United States Patent
Catlos et al.

[11] Patent Number: 5,933,923
[45] Date of Patent: Aug. 10, 1999

[54] BUCKLE FOR CARGO CONTROL STRAP

[75] Inventors: Peter V. Catlos, Port Huron, Mich.; Jan Vrto, Lucatin, Slovakia

[73] Assignee: Tatra Corporation, Port Huron, Mich.

[21] Appl. No.: 09/023,422

[22] Filed: Feb. 13, 1998

Related U.S. Application Data

[60] Provisional application No. 60/037,771, Feb. 13, 1997.
[51] Int. Cl.[6] .............................. A44B 11/00; B25B 25/00
[52] U.S. Cl. .................... 24/68 CD; 24/196; 24/265 AL
[58] Field of Search ................................ 24/68 CD, 16 R, 24/68 R, 265 AL, 196, 197, 175, 182, 200, 616

[56] References Cited

U.S. PATENT DOCUMENTS

| | | | |
|---|---|---|---|
| 2,919,481 | 1/1960 | Finken et al. | 24/196 |
| 2,977,655 | 4/1961 | Peters . | |
| 3,165,804 | 1/1965 | Marosy | 24/616 |
| 3,447,208 | 6/1969 | Beach . | |
| 3,913,977 | 10/1975 | Takada | 24/196 |
| 4,667,378 | 5/1987 | Sturm | 24/616 |
| 4,810,036 | 3/1989 | Buser | 24/265 AL |
| 4,823,443 | 4/1989 | Waters | 24/68 CD |
| 5,058,243 | 10/1991 | Rasmussen | 24/68 CD |
| 5,173,996 | 12/1992 | Chou | 24/68 CD |
| 5,600,875 | 2/1997 | Chang . | |

FOREIGN PATENT DOCUMENTS

| | | |
|---|---|---|
| 0 119 891 | 9/1984 | European Pat. Off. . |
| 2 279 992 | 11/1992 | United Kingdom . |

*Primary Examiner*—Victor N. Sakran
*Attorney, Agent, or Firm*—Dickinson Wright PLLC

[57] ABSTRACT

A cargo strap buckle comprises two sets of pins arranged between opposing plates. One set of pins is fixed to the plates and positioned between the other set of pins. The pins of the other set are separable or capable of disengagement from the plates or buckle to facilitate looping a cargo strap around the pins. In one mode, one pin can be totally disengaged with one pin only being partially disengaged. In another mode, both pins can be partially disengaged and one or both pins can also be longitudinally adjustable with respect to the plates. In one use, the cargo strap is first fed between the fixed pins and the pins are separated from the plates to facilitates strap attachment. In another use, when one or both pins are not totally removable from the buckle, the pin or pins is moved with respect to the plates for strap attachment. In either mode, the strap can then be tensioned for securing cargo or the like. The separable pins minimize strap waste by eliminating strap cutting for strap attachment or removal.

19 Claims, 2 Drawing Sheets

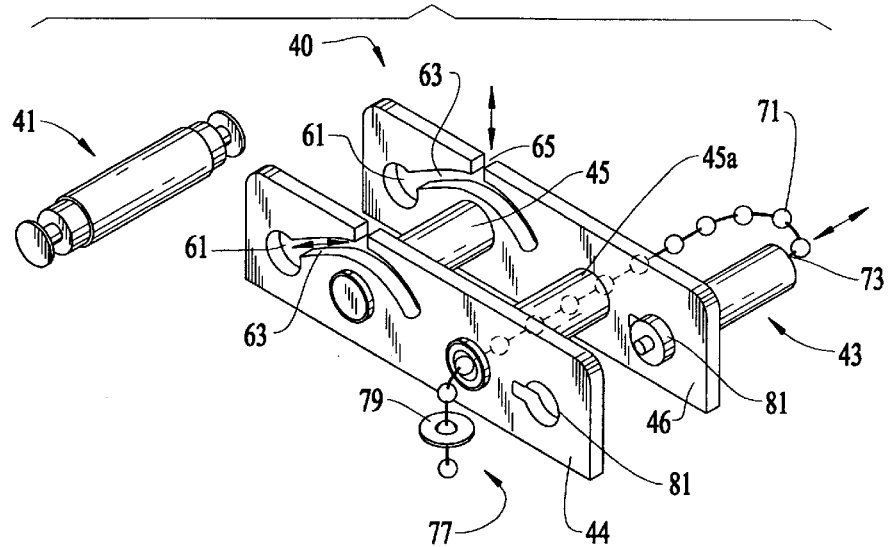
FIG. 3
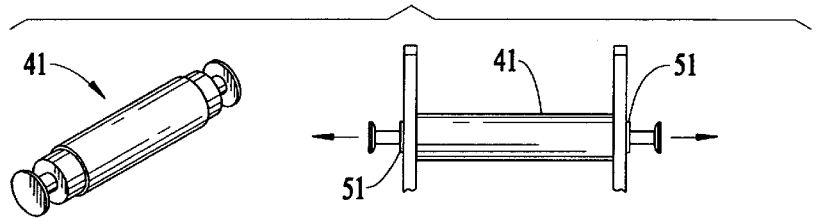
FIG. 4
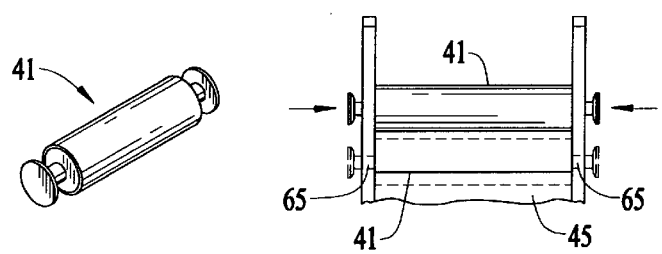
FIG. 5
FIG. 6
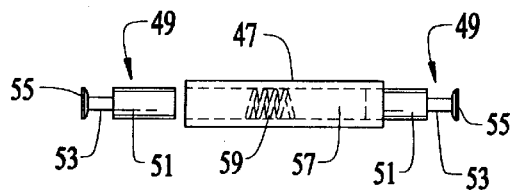
FIG. 7
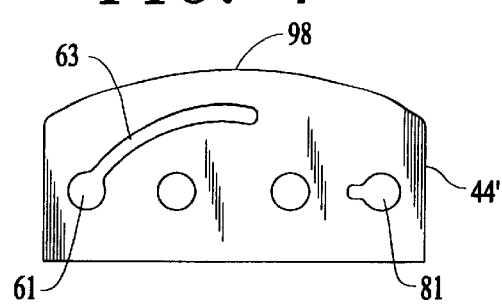

BUCKLE FOR CARGO CONTROL STRAP

This application claims the benefit of U.S. Provisional Application 60/037,771, filed Feb. 13, 1997.

TECHNICAL FIELD

This invention relates to the art of devices for securing straps, particularly straps used for securing cargo.

BACKGROUND

It is known to secure cargo against movement during shipping by wrapping a strap around the cargo and then placing the strap under tension. A device known as a cargo control buckle is known for use in this arrangement. A cargo control buckle secures opposed ends of the strap by engaging loops in the strap and passing portions of the strap over each other so that they must move in opposite directions to loosen or tighten the strap. These portions are urged against each other by the tension on the strap. Thus, the frictional force between the portions of the strap retains the tension on the strap. One such buckle includes a base having four, essentially parallel pins. The pins are fixed to the base, and the ends of the strap are wound around the pins to provide the desired engagement between the strap portions.

The pins in the known buckles are permanently fixed to the base, and this presents several disadvantages. First, application of the strap to the buckle requires the strap to be cut from the roll of strap material. This is because the ends of the strap must be laced around the pins in the proper arrangement before it can be tightened. When the strap is tightened, however, a significant length of the strap material is recovered. This length of strap material represents waste because it is discarded after tensioning of the strap. Also, detachment from the cargo requires that the strap be cut because the buckle provides no means for release of tension. This also results in waste of strap material because the strap is necessarily shortened by its cutting.

SUMMARY OF THE INVENTION

In accordance with the invention, a cargo control buckle includes a base with two sets of two pins, with one pin fixed and one pin movable in each set. This arrangement allows the strap to be laced through the pins without first cutting the length of strap from the roll of strap material. This arrangement also allows the applied strap, which is under tension, to be released from the buckle without cutting the strap. Thus, strap material is saved during installation because tension can be applied to the strap before it is cut from the roll. Also, these features allow the strap to be reused in its original length, thus saving additional strap material.

In the preferred embodiment, four pins are mounted in a base formed by parallel plates. The pins extend between the plates and are secured to the plates at their opposed ends. One of the pins includes spring-loaded dowels as the ends that hold the pin to the plates in such a manner that it is removable. The other movable pin is freely engaged in openings in the plates, which allows the pin to move sideways and disengage from one side plate but not from the other plate.

Thus, the strap is cut from the coil only after it is engaged in two sets of pins and is tensioned. To release the cargo, the spring loaded pin is released from the base to create a sufficient slack in the strap to be removed from the buckle without cutting.

In yet another embodiment, the plates can include tracks to permit longitudinal adjustment of one or both pins. The pins are designed to slide within the tracks to permit either pin removal or pin movement. When the pin is mounted within the tracks without the capability to be removed, the pin is captive or secured to at least some portion of the plates so that it does not become lost or misplaced. By movement within the track, the pin can be manipulated to permit strap attachment and removal.

Another of the pins can be tethered to a portion of the buckle such as one of the plates or one of the fixed pins to facilitate pin movement while still maintaining captivity.

BRIEF DESCRIPTION OF THE DRAWINGS

FIG. 3 is a perspective view of another embodiment of the invention.

FIG. 4 is a schematic view of one of the pins of the invention in use.

FIG. 5 is a schematic view of the pin of FIG. 4 in another use.

FIG. 6 is an exploded view of one of the pins of FIG. 1

FIG. 7 shows an alternative plate design for the inventive buckle.

DETAILED DESCRIPTION OF THE INVENTION

Figure 1:
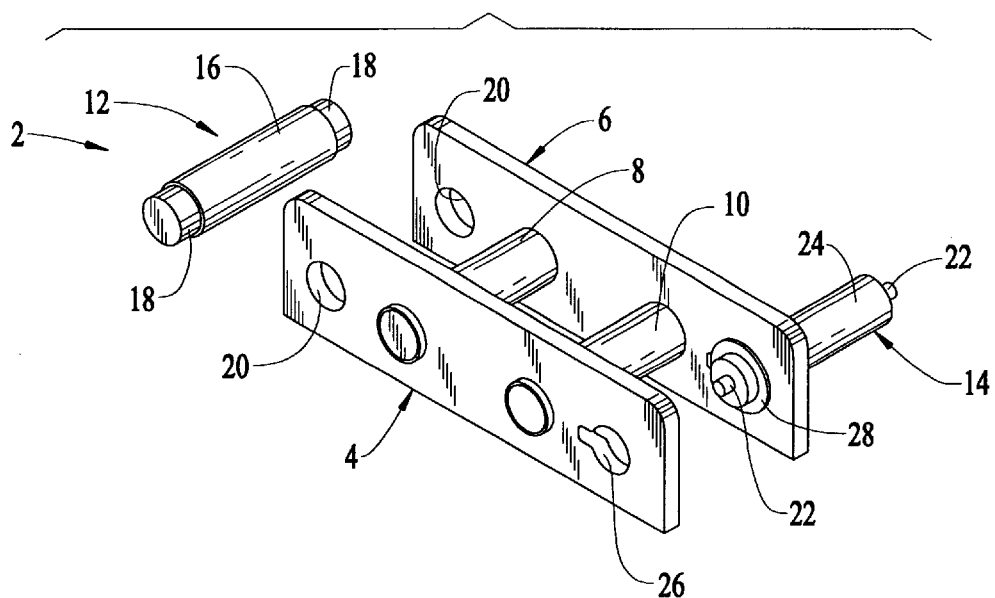
FIG. 1 is a perspective of a cargo control buckle in accordance with the invention.

With reference to FIG. 1, a cargo control buckle 2 in accordance with the invention comprises a base having parallel plates 4 and 6. These plates are generally rectangular but are not necessarily so. The plates are held in position by two fixed pins 8 and 10, which are fixed at their respective opposed ends to the plates 4 and 6. Two additional pins 12 and 14 are shown detached from the base.

Pin 12 is a tension release pin and comprises a central part 16 and opposed dowel ends 18. The ends 18 are of reduced diameter, compared to that of 16, and are spring-loaded whereby they are capable of sliding inward into axial recesses in the central part 16 but are normally urged outward. When the pin 12 is placed in the base, the ends 18 are received in openings 20 in the plates 4 and 6. The pin is easily attached to the base by pressing the ends 18 inward and placing the pin between the plates. The pin is then moved with respect to the base until the ends are aligned with the openings 20, whereby the ends automatically extend into the openings and retain the pin 12 in the base. Similarly, the pin 12 may be detached from the base by pressing the ends 18 inward and lifting the pin from the base.

Pin 14 is a lacing pin and includes end portions 22 that are of diameters smaller than that of the central part 24. These end portions are capable of being received in slots 26 in plates 4 and 6. These slots are tear-shaped, with the larger diameter portions thereof being located outward of the central part of the base. The inward parts of the slots 26 are of substantially the same diameter as the ends 22, whereby the ends are received securely in the slots when the pin 14 is urged toward the longitudinal center of the base.

The pin 14 further includes a flange 28 at one end. The flange 28 is located between an end 22 and the central portion and prevents complete detachment of the pin 14 from the base.

Figure 2:
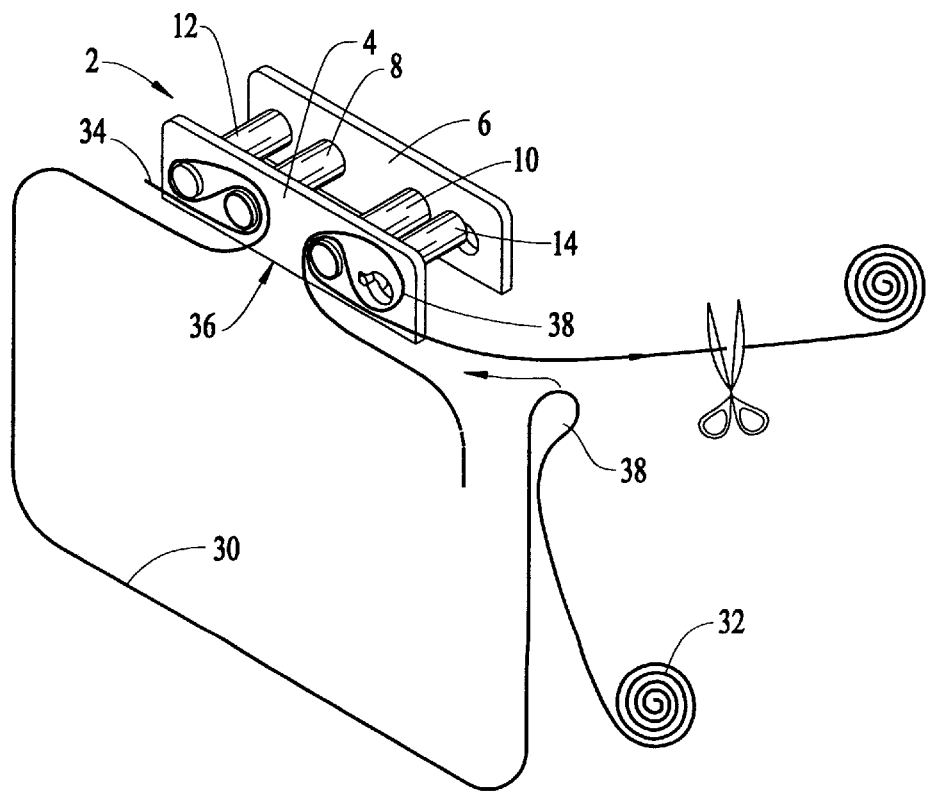
FIG. 2 is a schematic diagram illustrating the operation of the control buckle shown in FIG. 1.

FIG. 2 illustrates the application of a strap 30 to a cargo using the buckle 2, the strap having been obtained from a roll 32 of strap material. In the first step, pin 12 is placed in the base, and the free end 34 of the strap is laced through pins 8 and 12 as illustrated. According to this lacing pattern, pin 12 is received in a loop in the strap, and two parts of the strap overlap in the region 36, as is generally known in the art. This causes one course of the strap to be urged against a second course, thus creating a frictional force that prevents slippage of the strap.

The other end of the strap is attached to the other side of the buckle by first forming a loop 38 in the strap material. This loop is formed without cutting the strap from the roll 32. The loop is then passed over the fixed pin 10 with the pin 14 slid out of engagement with the plate 4 (as shown in FIG. 1). The pin 14 is then slid through the loop 38 and engaged with the plate 4. Tension is applied to the strap material to pull the strap 30 tightly about the cargo (not shown), and the strap 30 may then be cut from the roll 32.

It will be appreciated that the above process allows the strap to be easily applied to the buckle without first cutting the strap from the roll. This saves the significant amount of strap material that is recovered when placing tension on the strap.

The strap is detached from the buckle by simply removing pin 12 from the base to release the end 34 of the strap. This pin is released by depressing opposed ends 18 inwardly into the central part of the pin, whereby they are removed from the openings 20 in the plates 4 and 6. Detachment of the strap in this manner obviates the necessity of cutting the strap, thus providing additional savings of strap material.

Another embodiment of the inventive buckle is designated by the reference numeral 40 in FIG. 3, whereby pin designs that are alternatives to those depicted in FIG. 1 are employed. Referring to FIGS. 3 and 6, the buckle 40 includes separable pins 41 and 43 and fixed pins 45 and 45a, all arranged transversely between the plates 44 and 46. Pin 41 not only provides separation or disengagement from the plates 44 and 46 but also longitudinal adjustment along the plates 44 and 46.

The pin 41 includes a hollow pin body 47 and opposing pin ends 49. Each pin end 49 has a pin end body 51 with a guide rod 53 extending from the pin end body. The guide rods 53 have enlarged distal end portions which facilitate contact with the guide rods when manipulating the pin 41. The enlarged portions 55 are optional, the guide rods themselves could be distally located.

The pin body 47 has a recess 57 housing a spring 59. The spring biases the pin ends 49 outwardly a given distance, the distance controlled by stops (not shown) in the recess 57 limiting the travel of each pin end 49. Although one spring is shown, other biasing arrangements can be utilized as would be within the skill of the art, e.g., multiple springs or the like.

Each of the plates 44 and 46 has aligned openings 61 and tracks 63, each track being in communication with a respective opening 61. Each track 63 also has an opening 65 at an end face of each plate 44 and 46.

The openings 61 are sized to correspond to the pin end body sizes for mutual engagement. The tracks 63 are sized to correspond to the size of the guide rods 53 so that the guide rods 53 can travel within the tracks 63. With these size differences, the pin body 47 is larger than the pin end bodies 49, which in turn are larger than the guide rods 53.

In use, the pin 41 can be installed between the plates 44 and 46 by biasing the pin end bodies 49 inwardly so that the guide rods 53 can align with the openings 65. In this position, the guide rods can be inserted into the tracks 63, see FIG. 5 and be moved along the track length toward the openings 61. Once the pin 41 is in alignment with the openings 61, the pin end bodies 51 engage the openings 61 by reason of the outward bias of the pin end 49, see FIG. 4. Engagement between the pin end bodies 51 and the openings 61 secures or locks the pin 41 in position. Of course other size arrangements can be utilized with respect to the pin ends bodies 51 and guide rods 53 providing the longitudinal movement and securing or locking action is retained for the pin 41.

The track configuration is exemplary and other configurations can be used. In addition, the plate configurations are also exemplary and other shapes could be employed. One alternative shape is shown in FIG. 7 wherein a plate 44' has an arcuate edge 98 and a track 63' without the opening 65. As described below, this plate design keeps the pin 41 captive with respect to the buckle or separable from the openings 61 in the plates 44 and 46. Other plate shapes can be used as would be within the skill of the artisan.

The tracks 63 also allow the pin 41 to remain captive with respect to the plates 44 and 46 while still maintaining functionality. For example, when releasing a strap, the pin ends 49 can be biased inwardly so that the guide rods 53 align with the tracks 63 for pin 41 longitudinal movement. This movement can release the strap tension for strap removal form the buckle. It should be noted that the pin 41 can be removed as well by continuing the pin longitudinal movement until the guide rods exit the openings 65.

It should be understood that the same method as described above can be practiced with the FIG. 4 embodiment. That is, the pin 41 can be separated from the plates 44 and 46 for insertion into the loop and then reengaged for strap tensioning. Since the pin 41 can be also be kept captive when undoing the strap, there is less likelihood of loss of the pin.

As an alternative, the tracks 63 can be formed without the openings 65 such that the pin 41 remains captive or just separable from the openings 61. In this embodiment, the strap end would be looped around the fixed pin 45, looped around the pin 41 and then relooped around the fixed pin 45. Since the pin 41 is not removable in this embodiment as in the FIG. 1 embodiment, the loop cannot be formed first with the pin 41 inserted therein. The tracks 63 could also be formed as grooves in opposing faces of the plates 44 and 46 rather than through the plates, either with or without the openings 65. When the tracks are grooves, the guide rods are distally located and are biased outwardly when the pin 41 aligns with the openings 61. In this position, the rods or pin end bodies would require an inward biasing force to reengage the guide rods into the tracks 63 for pin 41 movement.

The pin 43 is similar to pin 14 in that each can be separated from at least one plate. In addition, the ends of the pin 43 and the openings 81 are similar to that shown and described for FIG. 1. In the FIG. 4 embodiment, the pin 43 is tethered by the chain 71. One end 73 of the chain is secured to the pin end 75. The chain 71 can then pass through the hollow pin 45a. The chain end 77 can have a washer 79 attached thereto. The washer 79 is sized to be larger than the opening in the pin 45a so that the chain 71 remains attached to the buckle 40. In this way, the pin 43 can be completely removed from the aligned openings 81 for strap attachment but still remain captive or not completely separated from the buckle or either of the plates 44 or 46. Of course, other tether attachments arrangements or tether types can be utilized. For example, a flexible nonmetallic cord or the like can be used in place of the chain. The point of attachment of the tether to the buckle or pin can also vary, e.g., the tether could be merely secured to a portion of either of the plates 44 or 46. The tether could also be removably attached to a portion of the buckle, e.g., a plate or fixed pin so that it can be captive or completely separable from the buckle.

The plates and pins are preferably made of metal whereby they may be reused many times. These may be made of other materials, however, as will be appreciated in the art.

The strap may be any of several known materials including woven, bonded and extruded strap materials.

What is claimed is:

1. A cargo strap buckle comprising at least two sets of pins arranged transversely between and in contact with a pair of plates, a first set of pins being fixed between the plates and at least a portion of each pin of a second set being separable from the plates, each pin arranged longitudinally along the plates to receive a strap for securing cargo, the first set arranged between the second set, one pin of the second set being both laterally and longitudinally adjustable with respect to a longitudinal axis of the plates, the one pin being fixed to at least one of the plates when the one pin is laterally adjusted and an end thereof is removed from one of the plates, the other pin of the second set being completely removable from the pair of plates.

2. The buckle of claim 1, wherein at least one of the separable pins comprises a pin body and outwardly biased opposing pin ends, each pin end being smaller in size than the pin body, the plates having aligned openings adjacent one pair of ends thereof, each aligned opening sized to received a pin end, outward bias of each pin end retaining the separable pin between the plates.

3. The buckle of claim 1, wherein the separable one pin comprises a pin body and outwardly biased opposing pin ends, each pin end being smaller in size than the pin body, the plates having aligned openings adjacent one pair of ends thereof, each aligned opening sized to received a pin end, outward bias of each pin end retaining the separable pin between the plates.

4. The buckle of claim 1, wherein the other pin has a tether attachment to a portion of the buckle to prevent complete separation.

5. The buckle of claim 4, wherein the tether is one of a chain and a flexible cord.

6. A cargo strap buckle comprising at least two sets of pins arranged transversely between a pair of plates, a first set of pins being fixed between the plates and at least a portion of each pin of a second set being separable from the plates, each pin arranged longitudinally along the plates to receive a strap for securing cargo, the first set arranged between the second set, wherein at least one of the separable pins comprises a pin body having opposing pin ends, each pin end being smaller in size than the pin body, the plates having aligned keyed openings adjacent one pair of ends thereof, a first portion of each keyed opening sized to correspond to the size of the pin body and a second portion of each keyed opening sized to correspond to the size of each pin end, one pin end having a flange arranged between the one pin end and the pin body, the flange sized larger than the keyed openings to prevent complete separation of the separable pin from the plates, the first portions of the keyed openings permitting transverse movement of the separable pin, the second portions permitting locking engagement of the separable pin and the plates when the separable pin in under strap tension.

7. A cargo strap buckle comprising at least two sets of pins arranged transversely between a pair of plates, a first set of pins being fixed between the plates and at least a portion of each pin of a second set being separable from the plates, each pin arranged longitudinally along the plates to receive a strap for securing cargo, the first set arranged between the second set, wherein at least one of the separable pins comprises a pin body having pin ends, the plates having aligned keyed openings adjacent one pair of ends thereof, a first portion of each keyed opening sized to correspond to the size of the pin body and a second portion of each keyed opening sized to correspond to the size of each pin end, the portions of the keyed openings permitting transverse movement of the separable pin, the other portion permitting locking engagement of the separable pin and the plates when the separable pin in under strap tension, the separable pin tethered to a portion of the buckle to prevent complete separation therefrom.

8. A cargo strap buckle comprising at least two sets of pins arranged transversely between a pair of plates, a first set of pins being fixed between the plates and at least a portion of each pin of a second set being separable from the plates, each pin arranged longitudinally along the plates to receive a strap for securing cargo, the first set arranged between the second set, wherein at least one of the separable pins comprises a pin body and outwardly biased pin ends, each pin end comprising a pin end body and a guide rod extending therefrom, each pin end body sized smaller than the pin body and each guide rod sized smaller than each pin end body, the plates having aligned openings adjacent one pair of ends thereof, each aligned opening sized to receive a pin end body and further being in communication with a track in the plate, each track sized to correspond to the size of the guide rod, the track permitting longitudinal travel of the pin body when the pin ends are biased inwardly to align each guide rod with a respective track.

9. The buckle of claim 8, wherein each track extends through each plate and each guide rod is sized to extend through each track, a distal end of each guide rod having an enlarged portion to facilitate inward biasing of each pin end body.

10. A cargo strap buckle comprising at least two sets of pins arranged transversely between a pair of plates, a first set of pins being fixed between the plates and at least a portion of each pin of a second set being separable from the plates, each pin arranged longitudinally along the plates to receive a strap for securing cargo, the first set arranged between the second set, wherein one pin from the second set is completely separable from the plates and only a portion of the other pin from the second set is separable from the plates, wherein the separable other pin comprises a pin body having opposing pin ends, each pin end being smaller in size than the pin body, the plates having aligned keyed openings adjacent one pair of ends thereof, a first portion of each keyed opening sized to correspond to the size of the pin body and a second portion of each keyed opening sized to correspond to the size of each pin end, one pin end having a flange arranged between the one pin end and the pin body, the flange sized larger than the keyed openings to prevent complete separation of the separable pin from the plates, the first portions of the keyed openings permitting transverse movement of the separable pin, the second portions permitting locking engagement of the separable pin and the plates when the separable pin in under strap tension.

11. A cargo strap buckle comprising at least two sets of pins arranged transversely between a pair of plates, a first set of pins being fixed between the plates and at least a portion of each pin of a second set being separable from the plates, each pin arranged longitudinally along the plates to receive a strap for securing cargo, the first set arranged between the second set, wherein one pin from the second set is completely separable from the plates and only a portion of the other pin from the second set is separable from the plates, wherein the separable other pin comprises a pin body having pin ends, the plates having aligned keyed openings adjacent one pair of ends thereof, a first portion of each keyed opening sized to correspond to the size of the pin body and a second portion of each keyed opening sized to correspond to the size of each pin end, the portions of the keyed openings permitting transverse movement of the separable pin, the other portion permitting locking engagement between the separable pin and the plates when the separable pin in under strap tension, the separable pin tethered to a portion of the buckle to prevent complete separation therefrom.

12. A cargo strap buckle comprising at least two sets of pins arranged transversely between a pair of plates, a first set of pins being fixed between the plates and at least a portion of each pin of a second set being separable from the plates, each pin arranged longitudinally along the plates to receive a strap for securing cargo, the first set arranged between the second set, wherein one pin from the second set is completely separable from the plates and only a portion of the other pin from the second set is separable from the plates, wherein the separable one pin comprises a pin body and outwardly biased pin ends, each pin end comprising a pin end body and a guide rod extending therefrom, each pin end body sized smaller than the pin body and each guide rod sized smaller than each pin end body, the plates having aligned openings adjacent one pair of ends thereof, each aligned opening sized to receive a pin end body and further being in communication with a track in the plate, each track sized to correspond to the size of the guide rod, the track permitting longitudinal travel of the pin body when the pin ends are biased inwardly to align each guide rod with a respective track, and a portion of each track opening to an edge face of the plate to permit removal of the separable one pin.

13. A cargo strap buckle comprising at least two sets of pins arranged transversely between a pair of plates, a first set of pins being fixed between the plates and at least a portion of each pin of a second set being separable from the plates, each pin arranged longitudinally along the plates to receive a strap for securing cargo, one separable pin from the second set comprising a pin body and outwardly biased pin ends, each pin end comprising a pin end body and a guide rod extending therefrom, each pin end body sized smaller than the pin body and each guide rod sized smaller than each pin end body, the plates having aligned openings adjacent one pair of ends thereof, each aligned opening sized to receive a pin end body and further being in communication with a track in the plate, each track sized to correspond to the size of the guide rod, the track permitting longitudinal travel of the pin body when the pin ends are biased inwardly to align each guide rod with a respective track, the other separable pin of the second set being tethered to a portion of the buckle.

14. The buckle of claim 13, wherein a portion of each track opens to an edge face of the plate to permit removal of the one separable pin.

15. The buckle of claim 13, wherein the other separable pin comprises a second pin body having second pin ends, the plates having aligned keyed openings adjacent one pair of ends thereof, a first portion of each keyed opening sized to correspond to the size of the second pin body and a second portion of each keyed opening sized to correspond to the size of each second pin end, the portions of the keyed openings permitting transverse movement of the separable pin, the other portion permitting locking engagement between the separable pin and the plates when the other separable pin is in under strap tension.

16. A method of securing a strap to a buckle comprising the steps of:
   a) providing a buckle comprising at least two sets of pins arranged transversely between a pair of plates, a first set of pins being fixed between the plates and at least a portion of each pin of a second set being separable from the plates, each pin arranged longitudinally along the plates to receive a strap for securing cargo;
   b) providing a strap;
   c) securing the strap around one of the separable pins and one of the fixed pins;
   d) forming a loop in a portion of the strap, feeding the loop between the fixed pins, separating the other separable pin and inserting the other separated pin into the loop; and
   e) engaging the other separated pin between the plates and tensioning the strap.

17. The method of claim 16, wherein each of the separable pins is disengaged from the plates prior to the steps (c) and (d).

18. The method of claim 16, wherein one of the separable pins is longitudinally translated along the plates after the tensioning of step (f) to facilitate strap removal from the buckle.

19. The method of claim 16, wherein the separable pin is both laterally and longitudinally adjustable with respect to a longitudinal axis of the plates, the separable pin being fixed to at least one of the plates when the one pin is laterally adjusted and an end thereof is removed from one of the plates such that the separable pin is laterally adjusted during the separating and inserting steps for insertion into the loop while still being fixed to one of the plates.

* * * * *